United States Patent Office 3,555,097
Patented Jan. 12, 1971

3,555,097
ACYLATED STYRENES
Paul Y. C. Gee, Woodbury, and Harry J. Andress, Jr., Pitman, N.J., assignors to Mobil Oil Corporation, a corporation of New York
No Drawing. Original application May 17, 1967, Ser. No. 639,049, now Patent No. 3,485,756, dated Dec. 23, 1969. Divided and this application Jan. 7 1969, Ser. No. 810,425
Int. Cl. C07c 49/76
U.S. Cl. 260—592  1 Claim

ABSTRACT OF THE DISCLOSURE

Liquid hydrocarbon compositions are provided which contain small amounts, sufficient to improve their fluidity characteristics, of acylated styrenes having at least about 20 carbon atoms per acyl group. A method for preparing these acylated styrenes is also provided.

---

This application is a division of my copending application Ser. No. 639,049, filed May 17, 1967, now Pat. No. 3,485,756.

BACKGROUND OF THE INVENTION

(1) Field of the invention

This invention relates to improved liquid hydrocarbon compositions, and in one of its aspects, relates to liquid hydrocarbon compositions having improved fluidity characteristics. More particularly, in this aspect, the invention relates to liquid hydrocarbon compositions containing certain agents which are effective in functioning as pour point depressants and fluidity improvers, particularly in such liquid hydrocarbon compositions as crude oils and petroleum residual oils.

(2) Description of the prior art

Acylated polystyrenes, as fluidity improvers in liquid hydrocarbons, have heretofore been suggested by the prior art. The use of these acylated polystyrenes, although effective for improving fluidity, necessitate first converting the styrene monomer to the polymer, followed by acylation of the latter. This prior polymerization of the styrene monomer imposes an additional manufacturing expense in the preparation of the fluidity improver. Furthermore, it is found that the acylated polystyrene only begins to exhibit some degree of fluidity improvement when employed in amounts of at least 0.1 percent, by weight, of the total liquid hydrocarbon composition. Compared with other conventional liquid hydrocarbon fluidity improvers which are generally employed in amounts as low as about .001 percent, by weight, of the total liquid hydrocarbon composition, the use of such relatively increased amounts of acylated polystyrenes for such purpose imposes an additional manufacturing cost.

SUMMARY OF THE INVENTION

It has now been found, as more fully hereinafter described, that liquid hydrocarbon compositions can be provided possessing improved fluidity characteristics by incorporating therein relatively small amounts of certain acylated styrenes. The ability to acylate only the styrene monomer, without prior polymerization of the latter, and to afford the possibility of employing these acylated styrenes in amounts as low as about .001 percent, by weight, of the liquid hydrocarbon composition, represents a marked advance in the art with respect to ease of manufacture and reduced cost with respect to employing agents which are effective as pour point depressants and fluidity improvers.

In general, the present invention provides improved liquid hydrocarbon compositions containing small amounts, sufficient to improve the fluidity characteristics of these compositions, of an acylated styrene having at least about 20 carbon atoms per acyl group. In accordance with the invention, these acylated styrenes can be effectively employed in the liquid hydrocarbon composition as pour point depressants and fluidity improvers in an amount from about .001 percent to about 1 percent, and preferably from about .01 percent to about 0.5 percent, by weight, of the total weight of the liquid hydrocarbon composition. Preferred acylated styrenes are those in which the acyl group contains from about 20 to about 24 carbon atoms, and in which the acyl group is derived from a straight-chain carboxylic acid.

The liquid hydrocarbons improved in accordance with the present invention may comprise any hydrocarbons in which fluidity improvement is desirable. A field of specific applicability, in accordance with the present invention, is in the improvement of liquid hydrocarbons boiling at a temperature from about 75° F. to about 1000° F. Of particular importance is the treatment of petroleum distillate oils which have pour and flow points above about 75° F. and which boil as high as about 750° F. or higher. It should be noted, in this respect, that the term "distillate oils" is not intended to be restricted to straight-run distillate fractions. The distillate oils can be straight-run distillate, catalytically or thermally cracked (including hydrocracked distillate oils) or mixtures of straight-run distillate oils, naphthas and the like, with cracked distillate stocks. Moreover, such oils can be treated in accordance with well known commercial methods, such as acid or caustic treatment, hydrogenation, solvent-refining, clay treatment, and the like.

The distillate oils are characterized by their relatively low viscosity, pour point and the like. The principal property which characterizes these hydrocarbons, however, is their distillation range. As hereinbefore indicated, this range will lie between about 75° F. and about 750° F. Obviously, the distillation range of each individual oil will cover a narrower boiling range, falling nevertheless within the above-mentioned limits. Likewise, each oil will boil substantially, continuously throughout its distillation range.

As hereinbefore indicated, the liquid hydrocarbon compositions improved in fluidity characteristics through the use of the acylated styrenes of the present invention have particular applicability to liquid hydrocarbon compositions in the form of crude oils or petroleum residual oils. Thus, the fluidity characteristics of very high wax-containing petroleum residual oils, such as the residuum of North African crude oils designated as Zelten, or similar petroleum oils which boil above approximately 650° F. and have pour points above 75° F., have particular applicability. Another specific type of crude oil to which the present invention also has particular applicability are the Amal crudes.

As hereinbefore indicated, the novel fluidity improvers of the present invention comprise acylated styrenes having at least about 20 carbon atoms per acyl group. These acylated styrenes are, in general, prepared by reacting acyl halides, having at least about 20 carbon atoms per molecule, with styrene at a temperature from about 40° C. to about 100° C. The reaction may be either completely thermal or may be carried out catalytically. In the latter instance, catalytic materials may be employed, such as aluminum chloride.

The acyl halide employed as a reactant with the styrene, in accordance with the process of the present invention, may comprise any acyl halide having a minimum of about 20 carbon atoms and preferably from about 20 to about 24 carbon atoms per molecule. Of these acyl halides, the acyl chlorides are preferred. Particularly preferred are acyl halides in which the acyl group is derived from straight-chain carboxylic acids, such as behenic acid, arachidic acid, stearic acid or commercially available acid mixtures which contain combinations of such acids. Acyl halides are produced by treating the corresponding acid, dissolved in a suitable solvent, e.g. o-dichlorobenzene, with a halogenating agent, such as phosphorous trichloride or thionyl chloride at a temperature from about 20° C. to about 85° C. for a time sufficient to complete formation of the acyl halide.

The styrene is next added to the acyl chloride in a mole to mole ratio, with the styrene being preferably added in slight excess. If the acylation of the styrene is to be carried out catalytically, the selected catalyst is preferably first added to the acyl halide followed by the addition of the styrene. The resulting mixture is then heated to the desired temperature and held at this temperature until the evolution of the corresponding acid (hydrogen) halide gas has ceased. When the acylation is carried out catalytically, various agents, such as aqueous alcohol solutions, may be added to the reaction product for the purpose of destroying the catalytic material.

DESCRIPTION OF SPECIFIC EMBODIMENTS

The following data and examples will serve to illustrate the preparation of the novel acylated styrenes of the present invention and their efficacy for improving the fluidity characteristics of liquid hydrocarbon compositions. It will be understood, however, that it is not intended that the invention be limited to the particular acylated styrenes or the particular liquid hydrocarbon compositions containing these acylated styrenes, as described. Various modifications of these compositions, as previously described, can be employed and will be readily apparent to those skilled in the art.

EXAMPLLE 1

In accordance with this example, an acylated styrene was prepared by reacting one mole of an acyl chloride (prepared as hereinafter described) with one mole of styrene in the presence of anhydrous aluminum chloride as a catalyst. The reaction is represented as follows:

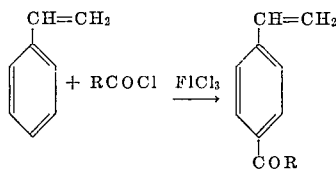

in which R is an alkyl group having at least 19 carbon atoms.

The acyl chloride employed in accordance with this example was first prepared by adding 45.8 grams (⅓ mole) of phosphorous trichloride dropwise to 328 grams (1 mole) of a mixture of straight-chain carboxylic acids containing, by weight, 80 percent behenic acid, 12 percent arachidic acid and 8 percent stearic acid, previously dissolved in 650 grams of o-dichlorobenzene at a temperature of approximately 50° C., with stirring. At the end of this addition, the resulting mixture was slowly heated to a temperature of 85° C. with stirring and was held at this temperature for a period of 3 hours to insure complete formation of the corresponding acid chlorides. To the mixture of acid chlorides thus produced were added gradually at room temperature with stirring 133 grams of anhydrous aluminum chloride, followed by the addition of 130 grams (1 mole plus 26 grams excess) of styrene. The mixture thus obtained was then slowly heated to a temperature of 85° C. and was held at this temperature until the evolution of HCl had ceased. To the resulting reaction product were then gradually added 150 cc. of isopropanol diluted with 150 cc. of water to destroy the aluminum chloride catalyst. The reaction product was then water-washed, filtered and topped to a temperature of 200° C. at 5 mm. of mercury. The final product, viz, a mixture of acylated styrenes, was fluid when still warm but waxy at room temperature.

EXAMPLE 2

The mixture of acylated styrenes produced in accordance with the foregoing Example 1, was next blended in an Amal crude oil and subjected to test to determine the efficacy of these acylated styrenes as pour point depressants and fluidity improvers. The Amal crude oil comprised a highly paraffinic, waxy, low sulfur, high asphaltene-content crude oil from Libya in North Africa. The test method employed was ASTM Test No. D–97 and was applied against the uninhibited crude oil as well as against samples of the same oil containing concentrations of 0.1 percent and 0.3 percent, by weight, respectively, of the acylated styrenes produced in accordance with the procedure of Example 1. The results obtained are shown in the following table.

TABLE.—ASTM POUR TEST RESULTS
[ASTM Test No. D–97]

| Additive | Concentration, percent (wt.) | Pour point, °F. |
|---|---|---|
| Uninhibited Crude Oil | 0 | 60 |
| Uninhibited Crude Oil plus acylated styrene of Example 1 | 0.1 | 30 |
| Do | 0.3 | 15 |

It will be apparent from the data set forth in the above table that the acylated styrenes of the present invention are highly effective as fluidity improvers in liquid hydrocarbons. As will be understood, results will vary with respect to the specific acylated styrene employed. In order to accomplish any given improvement, many of the aforementioned acylated styrenes can be employed in very small amounts. Others can be employed at the aforementioned practical concentrations of from about .01 to about 0.5 percent, by weight, of the liquid hydrocarbon composition.

Although the present invention has been described with preferred embodiments, it will be understood that various modifications and adaptations thereof may be resorted to without departing from the spirit and scope of the invention.

We claim:
1. An acylated styrene having from 20 to 24 carbon atoms per acyl group, in which the acyl group is derived from a straight-chain carboxylic acid.

References Cited

UNITED STATES PATENTS 2,197,709    4/1940    Ralston et al. _____ 260—592

DANIEL D. HORWITZ, Primary Examiner

U.S. Cl. X.R.

Adequately Cross Reference in parent Pat. No. 3,485,756.

PO-1050
(5/69)

UNITED STATES PATENT OFFICE
CERTIFICATE OF CORRECTION

Patent No. 3,555,097   Dated January 12, 1971

Inventor(s) PAUL Y. C. GEE and HARRY J. ANDRESS, JR.

It is certified that error appears in the above-identified patent and that said Letters Patent are hereby corrected as shown below:

Column 3, line 37  -  for "EXAMPLLE" read --EXAMPLE--

Column 3, diagram  -  for "$FlCl_3$" read --$AlCl_3$--

Signed and sealed this 18th day of May 1971.

(SEAL)
Attest:

EDWARD M. FLETCHER, JR.
Attesting Officer

WILLIAM E. SCHUYLER, JR.
Commissioner of Patents